(12) United States Patent
Wei et al.

(10) Patent No.: US 11,830,001 B2
(45) Date of Patent: Nov. 28, 2023

(54) BLOCKCHAIN CONSENSUS METHOD, ACCOUNTING NODE AND NODE

(71) Applicant: CHINA UNIONPAY CO., LTD., Shanghai (CN)

(72) Inventors: Zhangyong Wei, Shanghai (CN); Li Wang, Shanghai (CN); Kunbiao Lu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 684 days.

(21) Appl. No.: 17/044,000

(22) PCT Filed: Jan. 25, 2019

(86) PCT No.: PCT/CN2019/073232
§ 371 (c)(1),
(2) Date: Sep. 30, 2020

(87) PCT Pub. No.: WO2019/210714
PCT Pub. Date: Nov. 7, 2019

(65) Prior Publication Data
US 2021/0035095 A1    Feb. 4, 2021

(30) Foreign Application Priority Data
May 3, 2018  (CN) .......................... 201810414927.8

(51) Int. Cl.
*G06Q 20/38*  (2012.01)
*G06Q 40/12*  (2023.01)
(Continued)

(52) U.S. Cl.
CPC ....... *G06Q 20/389* (2013.01); *G06F 16/2379* (2019.01); *G06Q 20/02* (2013.01);
(Continued)

(58) Field of Classification Search
CPC .. G06Q 20/389; G06Q 20/02; G06Q 20/0655; G06Q 30/0185; G06Q 40/12;
(Continued)

(56) References Cited

U.S. PATENT DOCUMENTS

2015/0332283 A1   11/2015  Witchey
2015/0363769 A1*  12/2015  Ronca .................. G06Q 20/381
                                                      705/64
(Continued)

FOREIGN PATENT DOCUMENTS

CN        107124403 A     9/2017
CN        107231299 A    10/2017
(Continued)

OTHER PUBLICATIONS

Hyperledger, Architecture, vol. 1, Introduction to Hyperledger Business Blockchain Design Philosophy and Consensus, www.hyperledger.org, Nov. 23, 2017.
(Continued)

*Primary Examiner* — J. Brant Murphy
(74) *Attorney, Agent, or Firm* — Foley & Lardner LLP

(57) ABSTRACT

A blockchain consensus method includes: an accounting node generating a block and broadcasting verification information of the accounting node to other accounting nodes among N accounting nodes; receiving and verifying acknowledgement information broadcast by the other accounting nodes; and adding the block to a blockchain when the received acknowledgement information satisfies a second set condition. The N accounting nodes are determined according to coin age information carried in election requests broadcast by M election nodes. The acknowledgement information broadcast by the other accounting nodes is generated and broadcast by a first accounting node when received preparation information of a second accounting
(Continued)

node meets a first set condition; the preparation information of the second accounting node is generated and broadcast by the second accounting node when validating the verification information; and each of the first accounting node and the second accounting node is any one of the other accounting nodes.

14 Claims, 5 Drawing Sheets

(51) Int. Cl.
| | | |
|---|---|---|
| *G06F 16/23* | (2019.01) | |
| *G06Q 20/02* | (2012.01) | |
| *G06Q 20/06* | (2012.01) | |
| *G06Q 30/018* | (2023.01) | |
| *H04L 9/40* | (2022.01) | |

(52) U.S. Cl.
CPC ..... *G06Q 20/0655* (2013.01); *G06Q 30/0185* (2013.01); *G06Q 40/12* (2013.12); *H04L 63/12* (2013.01); *G06Q 2220/00* (2013.01); *G06Q 2230/00* (2013.01)

(58) Field of Classification Search
CPC .......... G06Q 2220/00; G06Q 2230/00; G06Q 20/223; G06Q 20/401; G06Q 20/065; G06F 16/2379; G06F 16/9024; H04L 63/12; H04L 2463/102; H04L 63/08; H04L 63/0815; H04L 67/10
See application file for complete search history.

(56) References Cited

U.S. PATENT DOCUMENTS

| | | | | |
|---|---|---|---|---|
| 2015/0363770 A1* | 12/2015 | Ronca | ................... | G06Q 20/382 705/64 |
| 2015/0363772 A1* | 12/2015 | Ronca | ................ | G06Q 20/3829 705/71 |
| 2015/0363773 A1* | 12/2015 | Ronca | ................... | G06Q 40/02 705/71 |
| 2015/0363777 A1* | 12/2015 | Ronca | ................... | H04L 9/3236 705/75 |
| 2015/0363778 A1* | 12/2015 | Ronca | ................... | H04L 9/3236 705/71 |
| 2015/0363782 A1* | 12/2015 | Ronca | ................ | G06Q 20/4016 705/75 |
| 2015/0363783 A1* | 12/2015 | Ronca | ................... | G06Q 20/382 705/71 |
| 2015/0365283 A1* | 12/2015 | Ronca | ................... | G06Q 20/065 705/71 |
| 2016/0218879 A1 | 7/2016 | Ferrin | | |
| 2018/0101560 A1* | 4/2018 | Christidis | ............. | H04L 9/3236 |
| 2018/0139278 A1* | 5/2018 | Bathen | ................ | H04L 9/3247 |
| 2018/0240112 A1* | 8/2018 | Castinado | ............ | G06Q 20/065 |
| 2018/0247191 A1* | 8/2018 | Katz | ....................... | A63F 13/67 |
| 2018/0337882 A1* | 11/2018 | Li | ........................... | H04L 61/35 |
| 2019/0289068 A1* | 9/2019 | Ma | ......................... | H04L 67/12 |
| 2020/0067697 A1* | 2/2020 | Puddu | ................ | G06Q 20/3827 |

FOREIGN PATENT DOCUMENTS

| | | |
|---|---|---|
| CN | 108848055 A | 11/2018 |
| WO | WO-2017/148245 A1 | 9/2017 |

OTHER PUBLICATIONS

King et al., "PPCoin: Peer-to-Peer Crypto-Currency with Proof-of-Stake" www.Semanticscholar.org, Aug. 19, 2012.

Xiaofei, Liu, "Research on Performance Improvement of Blockchain Based on Dynamic Authorization of Byzantine Fault Tolerance Consensus Algorithm" (Information & Technology, China Master's Theses Full-Text Database), No. 01, Jan. 15, 2018 (Jan. 15, 2018), English abstract.

* cited by examiner

BLOCKCHAIN CONSENSUS METHOD, ACCOUNTING NODE AND NODE

The present application is a national phase entry under 35 U.S.C. § 371 of International Application No. PCT/CN2019/073232, filed on Jan. 25, 2019, which claims the priority from Chinese Patent Application No. 201810414927.8, filed with the China National Intellectual Property Administration (CNIPA) on May 3, 2018 and entitled "Blockchain Consensus Method, Accounting Node and Node", which is hereby incorporated by reference in its entirety.

FIELD

Embodiments of the present invention relate to the field of blockchain technology, and in particular to a blockchain consensus method, an accounting node and a node.

BACKGROUND

In the prior art, the blockchain uses the Proof of Work (PoW for short) consensus mechanism, and the mining process is the core of the consensus mechanism. The mining is the process of fighting for the right to bookkeeping. The node obtaining the right to bookkeeping packages all the legal transactions it receives in a block, and connects the block to the main chain to obtain the Bitcoin reward. All the nodes in the Bitcoin network can compete for bookkeeping, but in the end, only one node that solves the proof-of-work problem first can complete the bookkeeping. Since the PoW requires the nodes to perform a series of calculations to fight for the right to bookkeeping, this process needs to consume a large amount of computing resources and electric power, and also needs the relatively long calculation time, which cannot meet the requirements of many projects that require the higher efficiency.

BRIEF SUMMARY

Embodiments of the present invention provide a blockchain consensus method, an accounting node and a node, so as to improve the consensus efficiency of the blockchain.

In a first aspect, an embodiment of the present invention provides a blockchain consensus method, which includes: generating, by an accounting node, a block and broadcasting verification information of the accounting node to other accounting nodes among N accounting nodes, wherein the N accounting nodes are determined according to coin age information carried in election requests broadcast by M election nodes, M is greater than or equal to 1, N is greater than or equal to 1, and M is greater than or equal to N; receiving and verifying, by the accounting node, acknowledgement information broadcast by the other accounting nodes, wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes; and adding, by the accounting node, the block to a blockchain when the received acknowledgement information broadcast by the other accounting nodes meets a second set condition.

Since a plurality of accounting nodes are selected from the election nodes according to their coin ages, instead of determining the accounting nodes by solving the proof-of-work problem, the efficiency of determining the accounting nodes is improved, and on the other hand, the resource consumption is reduced. Secondly, an accounting node generates a block, the accounting node that generates the block is determined according to the coin ages of the accounting nodes, and the accounting node with the largest coin age can be determined as the accounting node that generates the block, or an accounting node is randomly selected according to the coin ages as the accounting node that generates the block. The information of the accounting node and the information of the block are broadcast, and the accounting node can add the block to the local blockchain only after the broadcast information is validated by other accounting nodes, thereby ensuring the consistency and safety of the blockchain network. In addition, the accounting node can make consensus immediately after generating the block, and the consensus process does not need to solve the proof-of-work problem, thereby improving the consensus efficiency.

In a possible design, the accounting node receives and verifies preparation information broadcast by the other accounting nodes; and the accounting node generates and broadcasts acknowledgement information of the accounting node when the received preparation information broadcast by the other accounting nodes meets the first set condition.

In a possible design, the second accounting node receives acknowledgement information broadcast by the first accounting node and the acknowledgement information broadcast by the accounting node; and the second accounting node adds the block to the blockchain when the received acknowledgement information broadcast by the first accounting node and the acknowledgement information broadcast by the accounting node meets the second set condition.

In a possible design, for any node, the any node receives the election requests broadcast by the M election nodes, and determines N election nodes from the M election nodes according to the coin age information carried in the election requests broadcast by the M election nodes; the any node generates and broadcasts election result information including the N election nodes; and the any node determines N election nodes in received election result information sent by other nodes as the N accounting nodes when the received election result information sent by other nodes meets a third set condition. After the election nodes broadcast the election requests, other node(s) in the blockchain network sort(s) the election nodes according to the coin ages in the received election requests and then broadcast(s) the sorting result. Any node determines the election nodes in the sorting result as the accounting nodes when the received sorting result meets the third set condition, and the whole process does not need to solve the proof-of-work problem, thereby improving the efficiency of determining the accounting nodes on the one hand, and reducing the resource consumption on the other hand.

In a possible design, the accounting node determines another accounting node that broadcasts acknowledgement information as a faulty node and broadcasts a first faulty node removal request when the accounting node determines that the received acknowledgement information is not validated; the accounting node receives and verifies a second faulty node removal request that is generated and broadcast by the other accounting nodes after determining that the received first faulty node removal request is validated; and the accounting node broadcasts an accounting node reselection request when the received second faulty node removal request meets a fourth set condition, so that non-accounting nodes broadcast election requests to participate in the accounting node competition after receiving the accounting node reselection request. The accounting node broadcasts the faulty node removal request when it finds a faulty node, and broadcasts the accounting node reselection request after the faulty node removal request is approved by other accounting nodes, thus avoiding the interference of the faulty node to the blockchain network, and improving the stability of the blockchain network.

In a possible design, the accounting node is a main accounting node, the other accounting nodes are backup accounting nodes, the main accounting node is an accounting node carrying the largest coin age information in an election request among the N accounting nodes, and the backup accounting nodes are accounting nodes among the N accounting nodes except the main accounting node. Since the nodes with more rights and interests have more motivation to maintain the system security, the main accounting node initiates the consensus process after the main accounting node and the backup accounting nodes are determined from the N accounting nodes according to the coin age information, which can further improving the system security.

In a second aspect, an embodiment of the present invention provides an accounting node, including: a first broadcast module configured to generate a block and broadcast verification information of the accounting node to other accounting nodes among N accounting nodes, wherein the N accounting nodes are determined according to coin age information carried in election requests broadcast by M election nodes, M is greater than or equal to 1, N is greater than or equal to 1, and M is greater than or equal to N; a verification module configured to receive and verify acknowledgement information broadcast by the other accounting nodes, wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes; and a first processing module configured to add the block to a blockchain when the received acknowledgement information broadcast by the other accounting nodes meets a second set condition.

In a possible design, the verification module is further configured to receive and verify preparation information broadcast by the other accounting nodes; and the first processing module is further configured to generate and broadcast acknowledgement information of the accounting node when the received preparation information of the other accounting nodes meets the first set condition.

In a possible design, the accounting node further includes: a first receiving module configured to receive acknowledgement information broadcast by the first accounting node and the acknowledgement information broadcast by the accounting node; and the processing module is further configured to add the block to a blockchain when the received acknowledgement information broadcast by the first accounting node and the acknowledgement information broadcast by the accounting node meets the second set condition.

In a possible design, the first processing module is further configured to determine another accounting node that broadcasts acknowledgement information as a faulty node and broadcast a first faulty node removal request when determining that the received acknowledgement information broadcast by the another accounting node is not validated; the verification module is further configured to receive and verify a second faulty node removal request that is generated and broadcast by the other accounting nodes after determining that the received first faulty node removal request is validated; and the first broadcast module is further configured to broadcast an accounting node reselection request when the received second faulty node removal request meets a fourth set condition, so that non-accounting nodes broadcast election requests to participate in accounting node competition after receiving the accounting node reselection request.

In a possible design, the accounting node is a main accounting node, the other accounting nodes are backup accounting nodes, the main accounting node is an accounting node carrying the largest coin age information in an election request among the N accounting nodes, and the backup accounting nodes are accounting nodes among the N accounting nodes except the main accounting node.

In a third aspect, an embodiment of the present invention provides a node, including:
a second receiving module configured to receive election requests broadcast by M election nodes, and determine N election nodes from the M election nodes according to coin age information carried in the election requests broadcast by the M election nodes; a second broadcast module configured to generate and broadcast election result information including the N election nodes; and a second processing module configured to determine N election nodes in received election result information sent by other nodes as N accounting nodes when the received election result information meets a third set condition.

In a fourth aspect, an embodiment of the present invention provides a terminal device, which includes at least one processing unit and at least one storage unit, wherein the storage unit stores a computer program that causes the processing unit to perform the steps of any method described above when being executed by the processing unit.

In a fifth aspect, an embodiment of the present invention provides an electronic device, including: a processor, a memory, a transceiver and a bus interface, wherein the processor, the memory, the transceiver and the bus interface are connected through buses;
the processor is configured to read a program in the memory to perform the following method: generating a block and broadcasting via the transceiver verification information of the accounting node to other accounting nodes among N accounting nodes, wherein the N accounting nodes are determined according to coin age information carried in election requests broadcast by M election nodes, M is greater than or equal to 1, N is greater than or equal to 1, and M is greater than or equal to N; receiving via the transceiver acknowledgement information broadcast by the other accounting nodes and verifying the acknowledgement information broadcast by the other accounting nodes, wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes; and adding the block to a blockchain when the acknowledgement information broadcast by the other accounting nodes and received via the transceiver meets a second set condition;

the memory is configured to store one or more executable programs and store data used by the processor when performing operations.

In a sixth aspect, an embodiment of the present invention provides an electronic device, including: a processor, a memory, a transceiver and a bus interface, wherein the processor, the memory, the transceiver and the bus interface are connected through buses;

the processor is configured to read a program in the memory to perform the following method: determining N election nodes in election result information sent by other nodes and received via the transceiver as accounting nodes when the election result information meets a third set condition; and the transceiver is configured, under the control of the processor, to receive election requests broadcast by M election nodes, and determine N election nodes from the M election nodes according to the coin age information carried in the election requests broadcast by the M election nodes; and generate and broadcast the election result information including the N election nodes;

the memory is configured to store one or more executable programs and store data used by the processor when performing operations.

In a seventh aspect, an embodiment of the present application provides a non-transitory computer readable storage medium storing instructions, which cause a computer to perform the method in the first aspect or in any possible implementation of the first aspect when running on the computer.

In an eighth aspect, an embodiment of the present application provides a computer program product containing instructions, which cause a computer to perform the method in the first aspect or in any possible implementation of the first aspect when running on the computer.

In embodiments of the present invention, since a plurality of accounting nodes are selected from the election nodes according to their coin ages, instead of determining the accounting nodes by solving the proof-of-work problem, the efficiency of determining the accounting nodes is improved on the one hand, and the resource consumption is reduced on the other hand. Secondly, the accounting node generates the block and broadcasts the information of the accounting node and the information of the block, and the accounting node can add the block to the local blockchain only after the broadcast information is validated by other accounting nodes, thereby ensuring the consistency and safety of the blockchain network. In addition, the accounting node can make consensus immediately after generating the block, and the consensus process does not need to solve the proof-of-work problem, thereby improving the consensus efficiency.

BRIEF DESCRIPTION OF THE DRAWINGS

In order to illustrate the technical solutions in the embodiments of the invention more clearly, the accompanying figures which need to be used in describing the embodiments will be introduced below briefly. Obviously the accompanying figures described below are only some embodiments of the invention, and other accompanying figures can also be obtained by those ordinary skilled in the art according to these accompanying figures without creative labor.

DETAILED DESCRIPTION OF THE EMBODIMENTS

Figure 1:
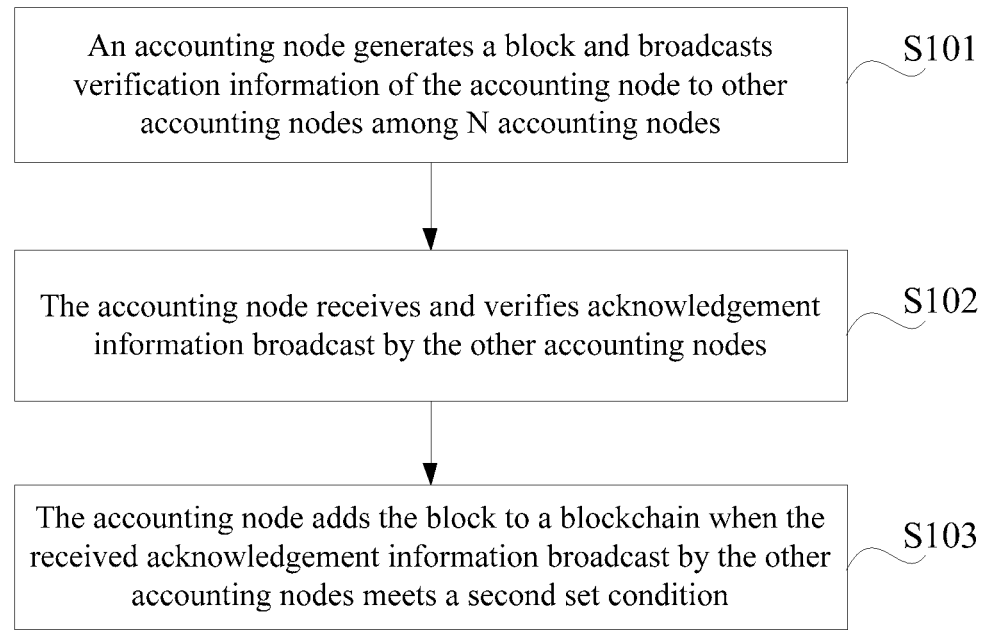
FIG. 1 is a schematic flowchart of a blockchain consensus method provided by an embodiment of the present invention.

In order to make the objects, technical solutions and beneficial effects of the invention clearer, the invention will further be illustrated below in details with reference to the drawings and the embodiments. It should be understood that the specific embodiments described herein are only used to explain the invention but not to limit the invention.

In order to make the objects, technical solutions and beneficial effects of the invention clearer, the invention will further be illustrated below in details with reference to the drawings and the embodiments. It should be understood that the specific embodiments described herein are only used to explain the invention but not to limit the invention.

It should be understood herein that any number of elements in the drawings are for purpose of example rather than limitation, and any naming is only used for distinction and has no limiting meaning. For the sake of understanding, the nouns involved in the embodiments of the present invention will be explained below.

Blockchain: in a narrow sense, the blockchain is a linked data structure that combines data blocks by way of sequential connection in chronological order, and is a distributed ledger that cannot be tampered with and forged in a cryptography way. In a broad sense, the blockchain technology is a new distributed infrastructure and calculation mode that uses the block-chain data structures to verify and store the data, uses the distributed node consensus algorithm to generate and update the data, uses the cryptography to ensure the security of data transmission and access, and uses the smart contract composed of automated script codes to program and operate the data.

An embodiment of the present invention provides a process of a blockchain consensus method. The process of the method may be performed by an accounting node, and as shown in FIG. 1, includes the following steps.

Step S101: an accounting node generates a block and broadcasts verification information of the accounting node to other accounting nodes among N accounting nodes.

Specifically, the accounting node is a node in the blockchain network that packages legal transactions into the block and connects the block to the blockchain. The verification information is used to indicate the information of the accounting node and the information of the block of the accounting node. Specifically, the format of the verification information is as follows:

<PRE-PREPARE, p, Block, sig(M)> wherein p is the block number determined by the accounting node when generating the block, Block is the block content, and sig(M) is the message signature of the accounting node.

The N accounting nodes are determined according to coin age information carried in election requests broadcast by M election nodes, M is greater than or equal to 1, N is greater than or equal to 1, and M is greater than or equal to N.

Step S102: the accounting node receives acknowledgement information sent by the other accounting nodes and verifies the acknowledgement information broadcast by the other accounting nodes.

Here, the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and the first accounting node is any one of the other accounting nodes, and the second accounting node is any one of the other accounting nodes and is different from the first accounting node.

Specifically, the second accounting node performs the verification after receiving the verification information broadcast by the accounting node. Specifically, it firstly verifies whether the message signature of the accounting node is legal, then verifies whether the block number of the next block to be generated in its own blockchain is consistent with the block number in the verification information, and then verifies whether verification information with the same block number but a different message signature of an accounting node has not been received. When the three verification conditions described above are all met, that is, the message signature of the accounting node is legal, the block number of the next block to be generated in the own blockchain is consistent with the block number in the verification information, and verification information with the same block number but a different message signature of an accounting node has not been received, the second accounting node generates the preparation information. The format of the preparation information is as follows:

<PREPARE, p, Block, sig(M)> wherein p is the block number, Block is the block content, and sig(M) is the message signature of the second accounting node. The second accounting node broadcasts the preparation information to other accounting nodes. When at least one of the three verification conditions described above is not met, which indicates that the second accounting node is a faulty node, the second accounting node is removed and an accounting node is re-elected to replace the second accounting node.

The first accounting node verifies the preparation information after receiving the preparation information. Specifically, it firstly verifies whether the message signature in the preparation information is legal, and then verifies whether the block number of the next block to be generated in its own blockchain is consistent with the block number in the preparation information. If the two verification conditions described above are met, the received preparation information is written into the log, and the acknowledgement information of the block is generated and broadcast when it is determined that the received preparation information meets the first set condition. Optionally, the first set condition may be: the amount of validated preparation information is greater than a first threshold that may be 2f, where f is the number of faulty nodes. Specifically, the format of the acknowledgment information is as follows:

<COMMIT, p, Block, sig(M)> wherein p is the block number, Block is the block content, and sig(M) is the message signature of the first accounting node.

When one of the two verification conditions described above is not met, which indicates that the first accounting node is a faulty node, the first accounting node is removed and an accounting node is re-elected to replace the first accounting node.

Optionally, the accounting node receives and verifies the preparation information broadcast by other accounting nodes, and generates and broadcasts acknowledgement information of the accounting node when the received preparation information of other accounting nodes meets the first set condition. In a specific implementation, the process in which the accounting node verifies the received preparation information and generates the acknowledgement information is the same as the process in which the first accounting node verifies the preparation information and generates the acknowledgement information, which will not be repeated here.

Step S103: the accounting node adds the block to a blockchain when the received acknowledgement information broadcast by the other accounting nodes meets a second set condition.

After receiving the acknowledgement information broadcast by the other accounting nodes, the accounting node verifies the acknowledgement information. Specifically, it firstly verifies whether the message signature in the acknowledgement information is legal, and then verifies whether the block number of the next block to be generated in its own blockchain is consistent with the block number in the acknowledgement information. If the two verification conditions described above are met, the received acknowledgement information is written into the log. The block is added to the blockchain when it is determined that the received acknowledgement information meets the second set condition. Optionally, the second set condition is: the validated acknowledgement information is greater than a second threshold that may be 2f+1, where f is the number of faulty nodes. When at least one of the two verification conditions described above is not met, which indicates that the accounting node is a faulty node, the accounting node is removed and an accounting node is re-elected to replace this accounting node.

Optionally, the second accounting node receives the acknowledgement information broadcast by the first accounting node and the acknowledgement information broadcast by the accounting node, and adds the block to the blockchain when the received acknowledgement information meets the second set condition. In a specific implementation, the process in which the second accounting node adds the block to the blockchain according to the received acknowledgement information is the same as the process in which the accounting node adds the block to the blockchain according to the received acknowledgement information, which will not be repeated here.

Since a plurality of accounting nodes are selected from the election nodes according to their coin ages, instead of determining the accounting nodes by solving the proof-of-work problem, the efficiency of determining the accounting nodes is improved, and on the other hand, the resource consumption is reduced. Secondly, the accounting node generates the block and broadcasts the information of the accounting node and the information of the block, and the accounting node can add the block to the local blockchain only after the broadcast information is validated by other accounting nodes, thereby ensuring the consistency and safety of the blockchain network. In addition, the accounting node can make consensus immediately after generating the block, and the consensus process does not need to solve the proof-of-work problem, thereby improving the consensus efficiency.

Figure 2A:
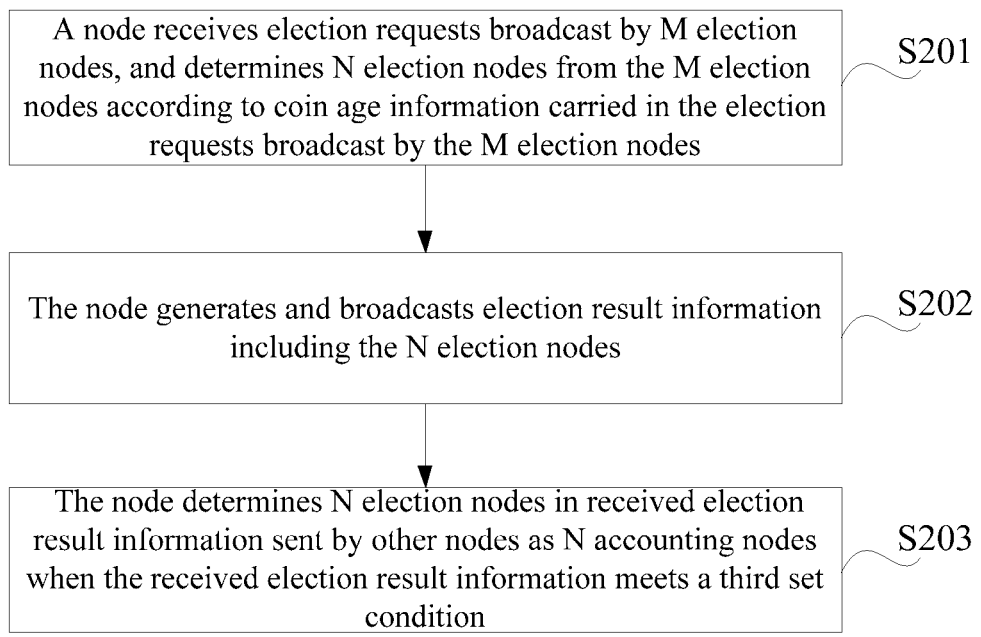
FIG. 2A is a schematic flowchart of a method of determining an accounting node provided by an embodiment of the present invention.

The process of the method of determining N accounting nodes will be specifically introduced below. This process is performed by any node in the blockchain network, and includes the following steps, as shown in FIG. 2A.

Step S201: a node receives election requests broadcast by M election nodes, and determines N election nodes from the M election nodes according to coin age information carried in the election requests broadcast by the M election nodes.

Step S202: the node generates and broadcasts election result information including the N election nodes.

Specifically, the node may be an election node that participates in the accounting node election, or may be an ordinary node that does not participate in the accounting node election. The election node broadcasts an election request when participating in the accounting node election. The format of the election request is as follows:

<CANDIDATE, addr, txs, sig(M)> wherein addr is the account address of the election node, txs is a transaction initiated newly by the election node, where the transaction has the private key signature of the election node, and the transaction content is to pay the coins in the Unspent Transaction Output (UTXO) to itself, update the transaction time and clear the coin age, and sig(M) is the message signature of the election node.

Optionally, the coin age is the product of the number of coins and the number of days. Specifically, the coin age of the election node can be determined according to the transaction content and the updated transaction time. For example, the election node A uses 10 coins to participate in the accounting node competition, the election node A acquired the 10 coins on Mar. 1, 2018, the transaction content is to pay 10 coins in the UTXO to itself, and the transaction time is updated to the current time, namely, Mar. 31, 2018. It can be known from the transaction content and transaction time that the coin age of the election node A is 300.

After receiving the election request, other nodes firstly check the legality of the transaction in the txs, and specifically check whether the coins of the transaction initiator meets the transaction requirement and whether the account address of the transaction receiver is legal, etc. If the transaction in the txs is illegal, the election request of the election node is ignored and the election node is added to the blacklist. If the transaction in the txs is legal, the election request of the election node is saved. When the set time arrives, the election requests received during the time period are counted, and the election nodes are sorted according to the coin ages in the election requests. For example, if the election requests of M election nodes are validated during this time period, the M election nodes are sorted from high to low by coin age, and then the top N election nodes are placed in the list and the election result information is broadcast to other nodes, where the format of the election result information is as follows:

<RESULT, list, sig(M)> wherein list is a list of account addresses of accounting nodes, and sig(M) is the message signature of the node that broadcasts the election result information.

Step S203: the node determines N election nodes in received election result information sent by other nodes as accounting nodes when the received election result information meets a third set condition.

After receiving the election result information, any node firstly verifies the message signature in the election result information, and then compares the lists in the received election result information. When the amount of election result information with the same list received by the node is greater than the third threshold, the election nodes in the list are determined as the accounting nodes.

According to the list, the node can determine whether it is elected as the accounting node. When the node is elected as the accounting node, it broadcasts the acknowledgement information of accounting node; and when the node is not elected as the accounting node, it does not broadcast the acknowledgement information of accounting node. The format of the acknowledgement information of accounting node is as follows:

<CONFIRM, list, sig(M)> wherein list is a list of account addresses of accounting nodes, and sig(M) is the message signature of the node that broadcasts the acknowledgement information of accounting node.

When any accounting node in the list receives acknowledgement information broadcast by other accounting nodes in the list and the received acknowledgement information is consistent, it is determined that the nodes in the list are the accounting nodes that have been successfully elected, and each accounting node can determine its own serial number according to the sequence in the list and clears the coin age. Since a plurality of accounting nodes are selected from the election nodes according to the coin ages, instead of determining the accounting nodes by solving the proof-of-work problem, the efficiency of determining the accounting nodes is improved, and on the other hand, the resource consumption is reduced. Since the accounting node is determined according to the coin age, and the coin age of the accounting node is cleared after the accounting node is determined, the person with many coins is not allowed to control the blockchain network, improving the security of the blockchain network.

Figure 2B:
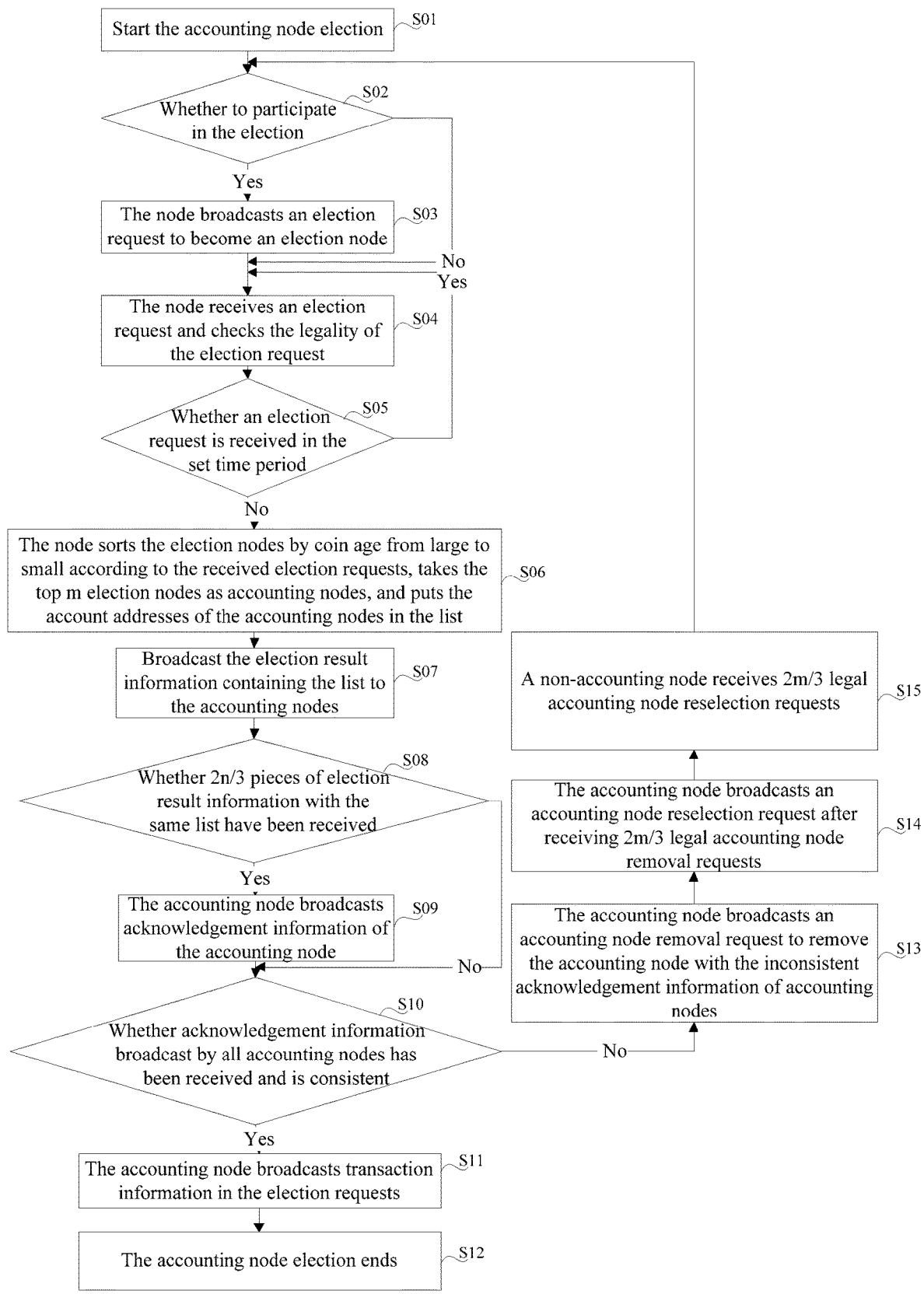
FIG. 2B is a schematic flowchart of a method of determining an accounting node provided by an embodiment of the present invention.

In order to better explain the embodiments of the present invention, the flow of a method of determining an accounting node provided by an embodiment of the present invention will be described below through specific implementation scenarios, and as shown in FIG. 2B, the flow includes the following steps.

Step S01: start the accounting node election.

Step S02: for any node in the blockchain network, judge whether it participates in the election; if so, perform step S03; otherwise, perform step S04.

Step S03: the node broadcasts an election request to become an election node.

Step S04: the node receives an election request and checks the legality of the election request.

Step S05: the node judges whether an election request is received in the set time period; if so, perform step S04; otherwise, perform step S06.

Step S06: the node sorts the election nodes by coin age from large to small according to the received election requests, takes the top m election nodes as accounting nodes, and puts the account addresses of the accounting nodes in the list.

Step S07: broadcast the election result information containing the list to the accounting nodes.

Step S08: An accounting node judges whether it has received 2n/3 pieces of election result information with the same list, where n is the total number of nodes; if so, perform step S09; otherwise, perform step S10.

Step S09: the accounting node broadcasts acknowledgement information of the accounting node.

Step S10: the accounting node judges whether it has received acknowledgement information of accounting nodes broadcast by all accounting nodes and acknowledgement information of the accounting node is consistent; if so, perform step S11; otherwise, perform step S13.

Step S11: the accounting node broadcasts the transaction information in the election request.

Step S12: the accounting node election ends.

Step S13: the accounting node broadcasts the accounting node removal request to remove the accounting node with the inconsistent acknowledgement information of accounting node.

Step S14: the accounting node broadcasts an accounting node reselection request after receiving 2m/3 legal accounting node removal requests.

Step S15: a non-accounting node performs step S02 after receiving 2m/3 legal accounting node reselection requests.

Figure 3:
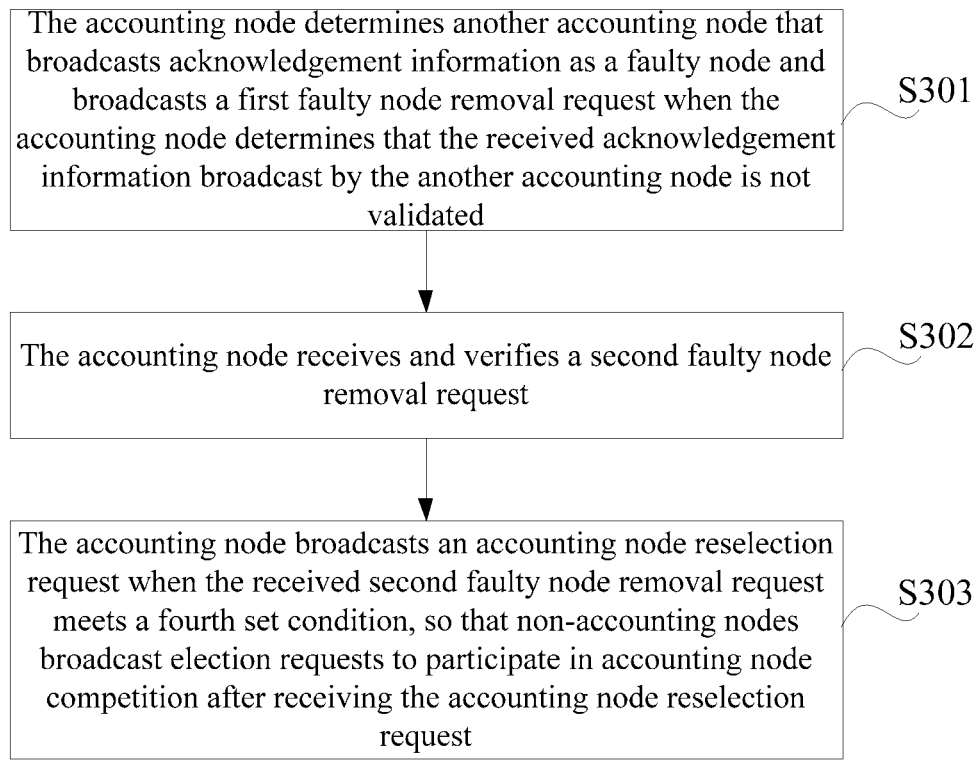
FIG. 3 is a schematic flowchart of a method of detecting a faulty node provided by an embodiment of the present invention.

Since there may be faulty nodes in the N accounting nodes and the faulty nodes will affect the security and stability of the whole blockchain network, it is necessary to detect and process the faulty nodes during the accounting node determination process and the consensus process, which specifically includes the following steps, as shown in FIG. 3.

Step S301: the accounting node determines another accounting node that broadcasts acknowledgement information as a faulty node and broadcasts a first faulty node removal request when the account node determines that the received acknowledgement information broadcast by the another accounting node is not validated.

It should be noted that the accounting node is not limited to detecting the faulty node by verifying the acknowledgement information, it is also possible to detect the faulty node by verifying the verification information and preparation information, or it is also possible to detect the faulty node according to whether the received acknowledgement information of accounting nodes is consistent and whether acknowledgement information of accounting nodes broadcast by all other accounting nodes in the list is received in the accounting node election stage.

In the following, the faulty node is detected by verifying the acknowledgement information as an example for illustration. After receiving the acknowledgement information broadcast by other accounting nodes, the accounting node verifies the acknowledgement information broadcast by other accounting nodes. When the acknowledgement information is not validated, the accounting node that broadcasts the acknowledgement information is determined as a faulty node and the first faulty node removal request is broadcast. The format of the first faulty node removal request is as follows:

<REMOVE, addr, c, sig(M)> wherein addr is the account address of the faulty node, c is the acknowledgement information broadcast by the faulty node, and sig(M) is the message signature of the accounting node that broadcasts the first accounting node removal request.

Step S302: the accounting node receives and verifies a second faulty node removal request.

The second faulty node removal request is generated and broadcast by other accounting nodes after determining that the received first faulty node removal request is validated, and the format of the second faulty node removal request is the same as that of the first faulty node removal request. Specifically, after receiving the first accounting node removal request, another accounting node verifies the acknowledgement information in the first accounting node removal request, and if the verification fails, the second accounting node removal request is generated and broadcast after the message signature in the received first accounting node removal request is modified as its own message signature.

Step S303: the accounting node broadcasts an accounting node reselection request when the received second faulty node removal request meets a fourth set condition, so that non-accounting node(s) broadcast(s) election request(s) to participate in accounting node competition after receiving the accounting node reselection request.

The accounting node generates and broadcasts the accounting node reselection request when the number of received second accounting node removal requests that have passed the verification for the same faulty node is greater than the fourth threshold, where the format of the accounting node reselection request is as follows:

<REVOTE, n, sig(M)> n is the serial number of the faulty node, and sig(M) is the message signature of the accounting node that broadcasts the accounting node reselection request.

When the non-accounting node receives and verifies the accounting node reselection request and determines that the number of received accounting node reselection requests that have passed the verification is greater than the fifth threshold, the non-accounting node broadcasts an election request to participate in the accounting node competition. At this time, the number of accounting nodes to be elected is the number of faulty nodes, and the serial numbers of accounting nodes to be elected correspond to the serial numbers of the faulty nodes in the list. The accounting node broadcasts the faulty node removal request when it finds a faulty node, and broadcasts the accounting node reselection request after the faulty node removal request is approved by other accounting nodes, thus avoiding the interference of the faulty node to the blockchain network, and improving the stability of the blockchain network.

Optionally, the N accounting nodes are divided into a main accounting node and backup accounting nodes, where the main accounting node is an accounting node carrying the largest coin age information in an election request among the N accounting nodes, and the backup accounting nodes are accounting nodes among the N accounting nodes except the main accounting node. In the blockchain consensus process, the main accounting node generates a block and broadcasts the verification information of the main accounting node to the backup accounting nodes among the N accounting nodes. The main accounting node receives and verifies the acknowledgement information broadcast by the backup accounting nodes, wherein the acknowledgement information broadcast by the backup accounting nodes is generated and broadcast by a first accounting node when the received preparation information of a second accounting node meets the first set condition. The preparation information of the second accounting node is generated and broadcast by the second accounting node when validating the verification information of the main accounting node, and each of the first accounting node and the second accounting node is any one of the backup accounting nodes. Since the accounting nodes with more rights and interests have more motivation to maintain the system security, the accounting node with the largest coin age among the N accounting nodes is determined as the main accounting node, and then the main accounting node initiates the consensus process, which can further improve the system security.

Figure 4:
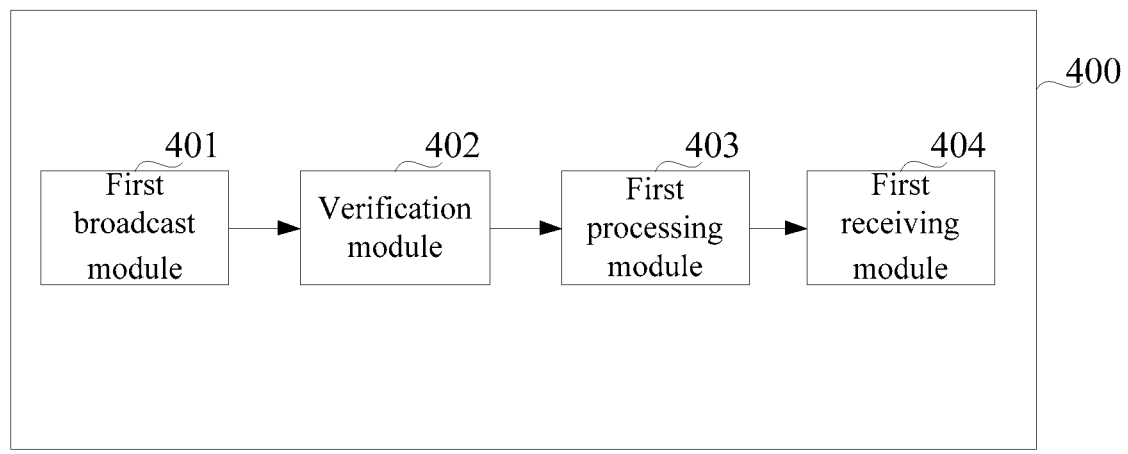
FIG. 4 is a structural schematic diagram of an accounting node provided by an embodiment of the present invention.

Based on the same technical concept, an embodiment of the present invention provides an accounting node. As shown in FIG. 4, the accounting node 400 includes:

- a first broadcast module 401 configured to generate a block and broadcast verification information of the accounting node to other accounting nodes among N accounting nodes, wherein the N accounting nodes are determined according to coin age information carried in election requests broadcast by M election nodes, M is greater than or equal to 1, N is greater than or equal to 1, and M is greater than or equal to N;
- a verification module 402 configured to receive and verify acknowledgement information broadcast by the other accounting nodes, wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes;
- a first processing module 403 configured to add the block to a blockchain when the received acknowledgement information broadcast by the other accounting nodes meets a second set condition.

In a possible design, the verification module 402 is further configured to receive and verify preparation information broadcast by the other accounting nodes;

the first processing module 403 is further configured to generate and broadcast acknowledgement information of the accounting node when the received preparation information of the other accounting nodes meets the first set condition.

In a possible design, the accounting node further includes:
a first receiving module 404 configured to receive acknowledgement information broadcast by the first accounting node and the acknowledgement information broadcast by the accounting node;

the processing module 403 is further configured to add the block to the blockchain when the received acknowledgement information meets the second set condition.

In a possible design, the first processing module 403 is further configured to determine another accounting node that broadcasts acknowledgement information as a faulty node and broadcast a first faulty node removal request when determining that the received acknowledgement information broadcast by the another accounting node is not validated;

the verification module 402 is further configured to receive and verify a second faulty node removal request that is generated and broadcast by the other accounting nodes after determining that the received first faulty node removal request is validated;

the first broadcast module 401 is further configured to broadcast an accounting node reselection request when the received second faulty node removal request meets a fourth set condition, so that non-accounting nodes broadcast election requests to participate in the accounting node competition after receiving the accounting node reselection request.

In a possible design, the accounting node is a main accounting node, the other accounting nodes are backup accounting nodes, the main accounting node is an accounting node carrying the largest coin age information among the N accounting nodes during election request, and the backup accounting nodes are accounting nodes among the N accounting nodes except the main accounting node.

Figure 5:
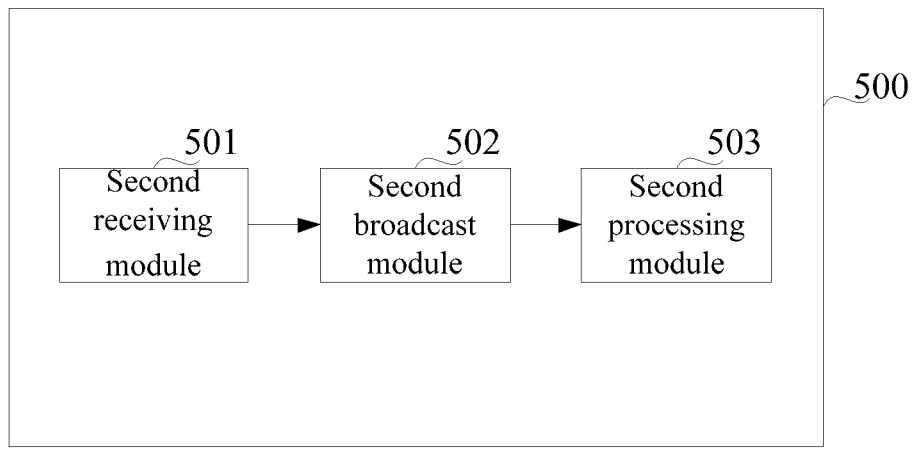
FIG. 5 is a structural schematic diagram of a node provided by an embodiment of the present invention.

Based on the same technical concept, an embodiment of the present invention provides a node. As shown in FIG. 5, the node 500 includes:

- a second receiving module 501 configured to receive election requests broadcast by M election nodes, and determine N election nodes from the M election nodes according to coin age information carried in the election requests broadcast by the M election nodes;
- a second broadcast module 502 configured to generate and broadcast election result information including the N election nodes;
- a second processing module 503 configured to determine N election nodes in received election result information sent by other nodes as accounting nodes when the received election result information meets a third set condition.

Figure 6:
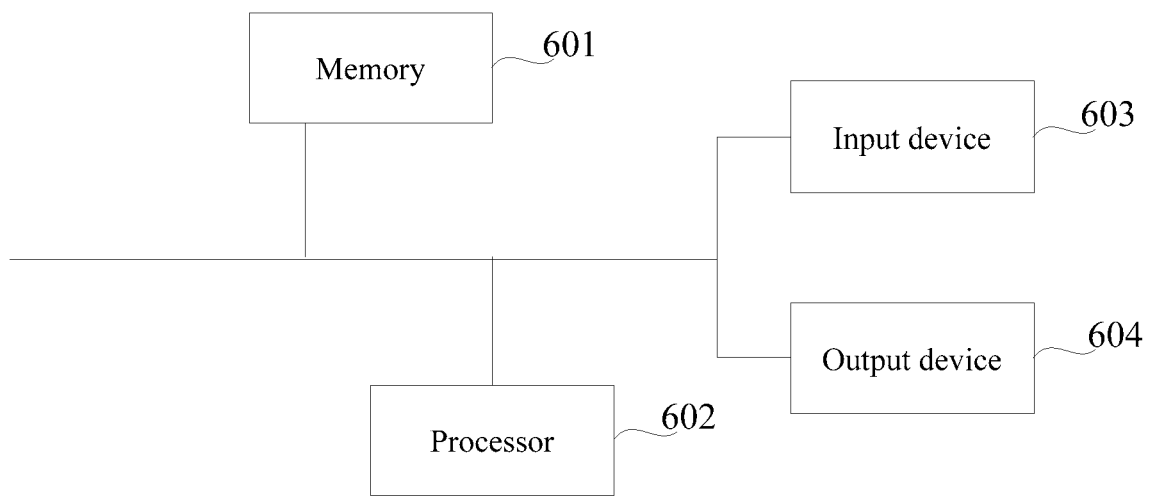
FIG. 6 is a structural schematic diagram of a terminal device provided by an embodiment of the present invention.

An embodiment of the present invention provides a terminal device, which includes at least one processing unit and at least one storage unit, wherein the storage unit stores a computer program that causes the processing unit to perform the steps of the blockchain consensus method when being executed by the processing unit. As shown in FIG. 6, which is a schematic diagram of a hardware structure of the terminal device described in the embodiment of the present invention, the terminal device can be a desktop computer, a portable computer, a smart phone, a tablet computer, etc. Specifically, the terminal device may include a memory 601, a processor 602, and a computer program stored on the memory, where the processor 602 implements the steps of any blockchain consensus method in the above embodiments when executing the program. Here, the memory 601 may include a Read-Only Memory (ROM) and a Random Access Memory (RAM), and provide the program instructions and data stored in the memory 601 to the processor 602.

Further, the terminal device described in the embodiment of the present application may further include an input device 603, an output device 604, and the like. The input device 603 may include a keyboard, a mouse, a touch screen, etc.; and the output device 604 may include a display device, such as a Liquid Crystal Display (LCD), a Cathode Ray Tube (CRT), a touch screen, etc. The memory 601, the processor 602, the input device 603 and the output device 604 may be connected through buses or in other ways. The bus connection is taken as an example in FIG. 6. The processor 602 invokes the program instructions stored in the memory 601 and performs the blockchain consensus method provided in the above embodiments according to the obtained program instructions.

An embodiment of the present invention further provides a computer readable storage medium that stores a computer program executable by a terminal device, where the program causes the terminal device to perform the steps of the blockchain consensus method when running on the terminal device.

Figure 7:
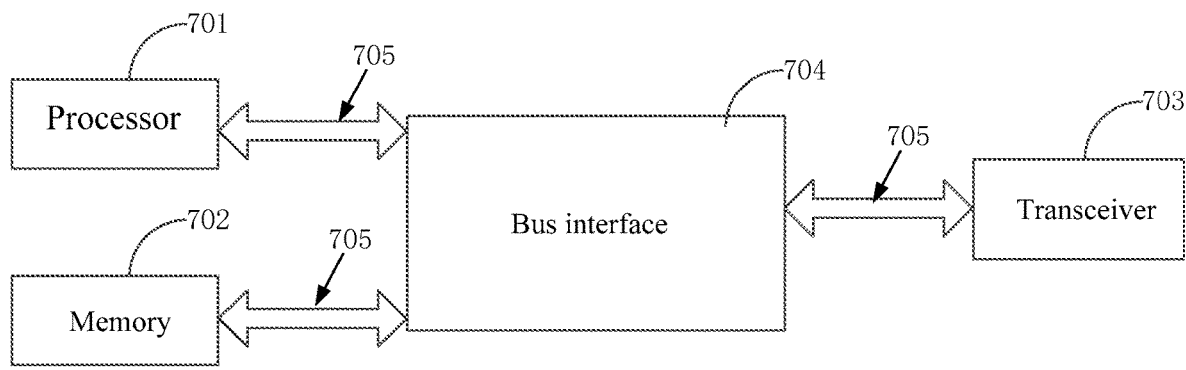
FIG. 7 is a structural schematic diagram of an electronic device provided by an embodiment of the present invention.

Based on the same concept, the present application provides an electronic device that can be used to perform the method flow of the above accounting node. FIG. 7 is a structural schematic diagram of an electronic device provided by the present application. The electronic device includes a processor 701, a memory 702, a transceiver 703 and a bus interface 704; wherein the processor 701, the memory 702, the transceiver 703 and the bus interface 704 are connected to each other through buses 705.

The memory 702 is used to store a program; and specifically, the program may include program codes including the computer operation instructions. The memory 702 may include a volatile memory, e.g., Random-Access Memory (RAM); the memory may also include a non-volatile memory, e.g, flash memory, Hard Disk Drive (HDD) or Solid-State Drive (SSD); and the memory 702 may also include a combination of the above types of memories.

The memory 702 stores the elements of: executable modules or data structures, or their subsets, or their extension sets:

Operation instructions including various operation instructions for implementing various operations.

Operation systems including various system programs for implementing various basic services and processing hardware-based tasks.

The bus 705 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 7, but it does not represent only one bus or only one type of bus.

The bus interface 704 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 701 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The processor 701 is configured to read the program in the memory 702 to perform the following method: generating a block and broadcasting via the transceiver 703 verification information of an accounting node to other accounting nodes among N accounting nodes, wherein the N accounting nodes are determined according to the coin age information carried in election requests broadcast by M election nodes, M is greater than or equal to 1, N is greater than or equal to 1, and M is greater than or equal to N; receiving via the transceiver 703 acknowledgement information broadcast by the other accounting nodes and verifying the acknowledgement information broadcast by the other accounting nodes, wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes; and adding the block to a blockchain when the received acknowledgement information broadcast by the other accounting nodes meets a second set condition.

The memory 702 is configured to store one or more executable programs and may store the data used by the processor 701 when performing the operations.

Optionally, the processor 701 is further configured to receive and verify preparation information broadcast by the other accounting nodes; and generate and broadcast acknowledgement information of the accounting node when the received preparation information of the other accounting nodes meets the first set condition.

Optionally, the transceiver 703 is further configured to receive the acknowledgement information broadcast by the first accounting node and the acknowledgement information broadcast by the accounting node; and the processor 701 is further configured to add the block to a blockchain when the received acknowledgement information meets the second set condition.

Optionally, the processor 701 is further configured to determine an accounting node that broadcasts acknowledgement information as a faulty node and broadcast a first faulty node removal request when determining that the received acknowledgement information is not validated; the processor 701 is further configured to receive and verify a second faulty node removal request that is generated and broadcast by the other accounting nodes after determining that the received first faulty node removal request is validated; and the transceiver 703 is further configured to broadcast an accounting node reselection request when the received second faulty node removal request meets a fourth set condition, so that non-accounting nodes broadcast election requests to participate in accounting node competition after receiving the accounting node reselection request.

Optionally, the accounting node is a main accounting node, the other accounting nodes are backup accounting nodes, the main accounting node is an accounting node carrying the largest coin age information among the N accounting nodes during election request, and the backup accounting nodes are accounting nodes among the N accounting nodes except the main accounting node.

It should be understood that the division of the above units is only the division of the logical functions, and these units may be fully or partially integrated into a physical entity or may be separated physically in the actual implementations. In an embodiment of the present application, the first broadcast module 401 and the first receiving module 404 may be implemented by the transceiver 703, and the verification module 402 and the first processing module 403 may be implemented by the processor 701. As shown in FIG. 7, the electronic device 700 may include a processor 701, a transceiver 703 and a memory 702, wherein the memory 702 may be configured to store the programs/codes pre-installed when the electronic device 700 leaves the factory, and may also store the codes used to be executed by the processor 701, etc.

As can be seen from the above, in the embodiments of the present invention, since a plurality of accounting nodes are selected from the election nodes according to their coin ages, instead of determining the accounting nodes by solving the proof-of-work problem, the efficiency of determining the accounting nodes is improved on the one hand, and the resource consumption is reduced on the other hand. Secondly, the accounting node generates the block and broadcasts the information of the accounting node and the information of the block, and the accounting node can add the block to the local blockchain only after the broadcast information is validated by other accounting nodes, thereby ensuring the consistency and safety of the blockchain network. In addition, the accounting node can make consensus immediately after generating the block, and the consensus process does not need to solve the proof-of-work problem, thereby improving the consensus efficiency.

Figure 8:
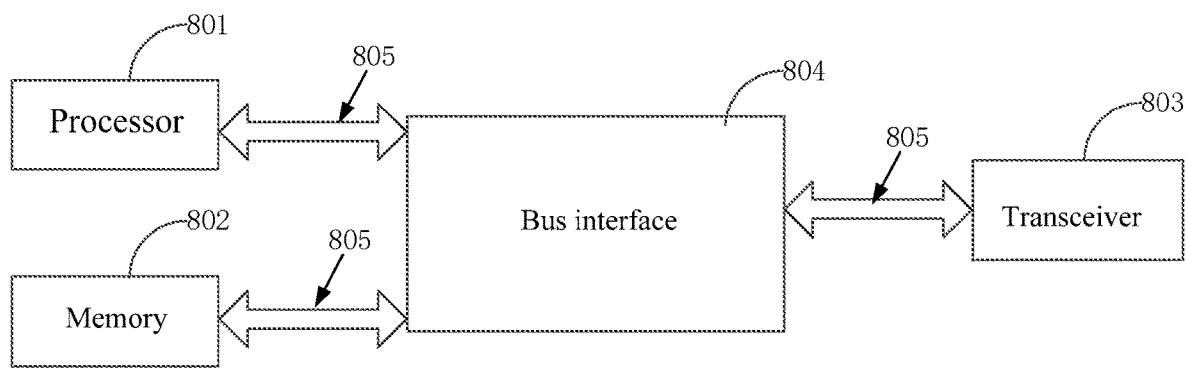
FIG. 8 is a structural schematic diagram of an electronic device provided by an embodiment of the present invention.

Based on the same concept, the present application provides an electronic device that can be used to perform the method flow of the above accounting node. FIG. 8 is a structural schematic diagram of an electronic device provided by the present application. The electronic device includes a processor 801, a memory 802, a transceiver 803 and a bus interface 804; wherein the processor 801, the memory 802, the transceiver 803 and the bus interface 804 are connected to each other through buses 805.

The memory 802 is used to store a program; and specifically, the program may include program codes including the computer operation instructions. The memory 802 may include a volatile memory, e.g., Random-Access Memory (RAM); the memory may also include a non-volatile memory, e.g, flash memory, Hard Disk Drive (HDD) or Solid-State Drive (SSD); and the memory 802 may also include a combination of the above types of memories.

The memory 802 stores the elements of: executable modules or data structures, or their subsets, or their extension sets:

Operation instructions including various operation instructions for implementing various operations.

Operation systems including various system programs for implementing various basic services and processing hardware-based tasks.

The bus 805 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 7, but it does not represent only one bus or only one type of bus.

The bus interface 804 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 801 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The processor 801 is configured to read the program in the memory 802 to perform the following method: determining N election nodes in the received election result information sent by other nodes as accounting nodes when the received election result information meets a third set condition.

The transceiver 803 is configured to receive election requests broadcast by M election nodes, and determine N election nodes from the M election nodes according to the coin age information carried in the election requests broadcast by the M election nodes; and generate and broadcast election result information including the N election nodes.

It should be understood that the division of the above units is only the division of the logical functions, and these units may be fully or partially integrated into a physical entity or may be separated physically in the actual implementations. In an embodiment of the present application, the second broadcast module 502 and the second receiving module 501 may be implemented by the transceiver 803, and the second processing module 503 may be implemented by the processor 801. As shown in FIG. 8, the electronic device 800 may include a processor 801, a transceiver 803 and a memory 802, wherein the memory 802 may be configured to store the programs/codes pre-installed when the electronic device 800 leaves the factory, and may also store the codes used to be executed by the processor 801, etc.

It should be understood by those skilled in the art that the embodiments of the invention may be provided as methods, systems or computer program products. Thus the embodiments of the invention can take the form of hardware embodiments alone, software embodiments alone, or embodiments combining the software and hardware aspects. Also the embodiments of the invention can take the form of computer program products implemented on one or more computer usable storage mediums (including but not limited to magnetic disk memories, CD-ROMs, optical memories and the like) containing computer usable program codes therein.

The embodiments of the invention are described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the embodiments of the invention without departing from the spirit and scope of the present application. Thus the present application is also intended to encompass these modifications and variations therein as long as these modifications and variations to the embodiments of the invention come into the scope of the claims of the present application and their equivalents.

What is claimed is:

1. A blockchain consensus method, comprising:
generating, by an accounting node, a block;
broadcasting, by the accounting node, verification information of the accounting node to other accounting nodes among N accounting nodes, wherein the N accounting nodes are determined according to coin age information carried in election requests broadcast by M election nodes, M is greater than or equal to 1, N is greater than or equal to 1, and M is greater than or equal to N;
receiving and verifying, by the accounting node, acknowledgement information broadcast by the other accounting nodes, wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes;
adding, by the accounting node, the block to a blockchain when the received acknowledgement information broadcast by the other accounting nodes meets a second set condition.

2. The method of claim 1, further comprising:
receiving and verifying, by the accounting node, preparation information broadcast by the other accounting nodes;
generating and broadcasting, by the accounting node, acknowledgement information of the accounting node when the received preparation information broadcast by the other accounting nodes meets the first set condition.

3. The method of claim 2, further comprising:
receiving, by the second accounting node, acknowledgement information broadcast by the first accounting node and the acknowledgement information broadcast by the accounting node;
adding, by the second accounting node, the block to the blockchain when the received acknowledgement information broadcast by the first accounting node and the acknowledgement information broadcast by the accounting node meets the second set condition.

4. The method of claim 1, wherein the N accounting nodes are determined according to coin age information carried in election requests broadcast by M election nodes, by:
receiving, by any node, the election requests broadcast by the M election nodes;
determining, by the any node, N election nodes from the M election nodes according to the coin age information carried in the election requests broadcast by the M election nodes;
generating and broadcasting, by the any node, election result information comprising the N election nodes; and
determining, by the any node, N election nodes in received election result information sent by other nodes as the N accounting nodes when the received election result information meets a third set condition.

5. The method of claim 1, further comprising:
determining, by the accounting node, another accounting node that broadcasts acknowledgement information as a faulty node and broadcasting a first faulty node removal request when the accounting node determines that the received acknowledgement information broadcast by the another accounting node is not validated;
receiving and verifying, by the accounting node, a second faulty node removal request that is generated and broadcast by the other accounting nodes after determining that the received first faulty node removal request is validated; and
broadcasting, by the accounting node, an accounting node reselection request when the received second faulty node removal request meets a fourth set condition, so that non-accounting nodes broadcast election requests to participate in accounting node competition after receiving the accounting node reselection request.

6. The method of claim 1, wherein the accounting node is a main accounting node, the other accounting nodes are backup accounting nodes, the main accounting node is an accounting node carrying largest coin age information in an election request among the N accounting nodes, and the backup accounting nodes are accounting nodes among the N accounting nodes except the main accounting node.

7. A non-transitory computer readable storage medium, storing computer instructions which cause a computer to perform the method of claim 1.

8. A computer program product, comprising computer programs stored on a non-transitory computer readable storage medium, wherein the computer programs comprise computer instructions which, when executed by a computer, cause the computer to perform the method of claim 1.

9. An electronic device, comprising a processor, a memory, a transceiver and a bus interface, wherein the processor, the memory and the transceiver are connected through buses;
the transceiver is configured to generate a block and broadcast verification information of an accounting node to other accounting nodes among N accounting nodes, wherein the N accounting nodes are determined according to coin age information carried in election requests broadcast by M election nodes, M is greater than or equal to 1, N is greater than or equal to 1, and M is greater than or equal to N;
the processor is configured to read a program in the memory to perform following operations: receiving and verifying acknowledgement information broadcast by the other accounting nodes, and adding the block to a blockchain when the received acknowledgement information broadcast by the other accounting nodes meets a second set condition; wherein the acknowledgement information broadcast by the other accounting nodes is generated and broadcast by a first accounting node when received preparation information of a second accounting node meets a first set condition; the preparation information of the second accounting node is generated and broadcast by the second accounting node when validating the verification information of the accounting node; and each of the first accounting node and the second accounting node is any one of the other accounting nodes;
the memory is configured to store one or more executable programs and store data used by the processor when performing the operations.

10. The electronic device of claim 9, wherein the processor is further configured to:

receive and verify preparation information broadcast by the other accounting nodes; and generate and broadcast acknowledgement information of the accounting node when the received preparation information broadcast by the other accounting nodes meets the first set condition.

11. The electronic device of claim 10, wherein, the transceiver is further configured to receive acknowledgement information broadcast by the first accounting node and the acknowledgement information broadcast by the accounting node;

the processor is further configured to add the block to the blockchain when the received acknowledgement information broadcast by the first accounting node and the acknowledgement information broadcast by the accounting node meets the second set condition.

12. The electronic device of claim 9, wherein the processor is further configured to:

determine another accounting node that broadcasts acknowledgement information as a faulty node and broadcast a first faulty node removal request when determining that the received acknowledgement information broadcast by the another accounting node is not validated; and receive and verify a second faulty node removal request that is generated and broadcast by the other accounting nodes after determining that the received first faulty node removal request is validated;

the transceiver is further configured to broadcast an accounting node reselection request when the received second faulty node removal request meets a fourth set condition, so that non-accounting nodes broadcast election requests to participate in accounting node competition after receiving the accounting node reselection request.

13. The electronic device of claim 9, wherein the accounting node is a main accounting node, the other accounting nodes are backup accounting nodes, the main accounting node is an accounting node carrying largest coin age information in an election request among the N accounting nodes, and the backup accounting nodes are accounting nodes among the N accounting nodes except the main accounting node.

14. An electronic device, comprising a processor, a memory, a transceiver and a bus interface, wherein the processor, the memory, the transceiver and the bus interface are connected through buses;

the transceiver is configured to receive election requests broadcast by M election nodes, and determine N election nodes from the M election nodes according to coin age information carried in the election requests broadcast by the M election nodes; and generate and broadcast election result information comprising the N election nodes;

the processor is configured to determine N election nodes in received election result information sent by other nodes as N accounting nodes when the received election result information meets a third set condition.

* * * * *